J. H. ELWARD.
DRIVE CHAIN.

No. 181,779.    Patented Sept. 5, 1876.

Witnesses:
Alex. Mahon
John G. Center

Inventor.
John H. Elward,
by A. M. Smith,
Attorney.

UNITED STATES PATENT OFFICE.

JOHN H. ELWARD, OF ST. PAUL, MINNESOTA.

IMPROVEMENT IN DRIVE-CHAINS.

Specification forming part of Letters Patent No. 181,779, dated September 5, 1876; application filed March 27, 1875.

*To all whom it may concern:*

Be it known that I, JOHN H. ELWARD, of St. Paul, county of Ramsey, State of Minnesota, have invented a new and useful Improvement in Chains, of which the following is a full, clear, and exact description, reference being had to the accompanying drawing, making part of this specification, in which—

Figure 1:
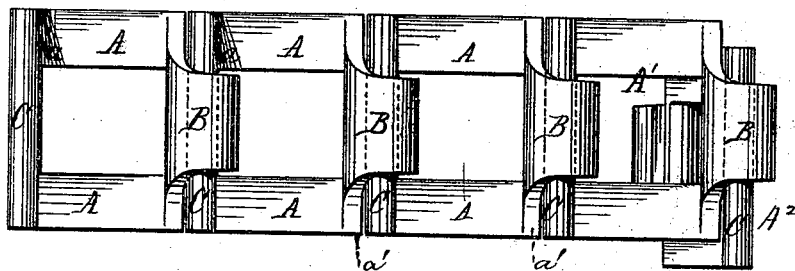
Figure 2:
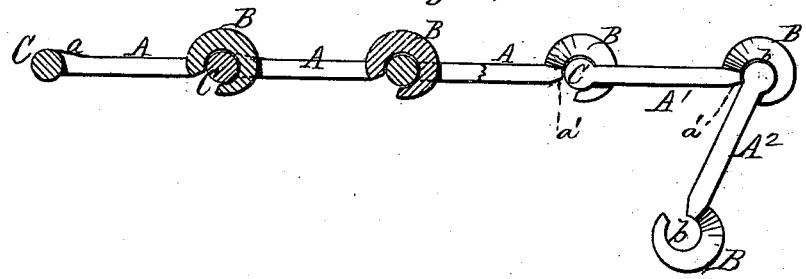

Figure 1 represents a plan view of a section of the chain; and Fig. 2 is a side elevation of the same, partly in section.

Similar letters of reference denote corresponding parts in both figures.

The invention relates to a novel construction of the links of driving or sprocket-wheel chains, in which the links are made removable, for diminishing or increasing the length of the chain, as desired, by means of an open hook at the end of one link, and a cylindrical end bar or rod at the adjoining end of the succeeding link; and consists in flattening the side bars of the links between the connecting-hook and end bar, and making them of increased width, for adapting the open hook to pass over them for connecting or disconnecting the link, while at the same time giving increased strength to those portions of the links upon which the heaviest strain comes, as hereinafter described.

In the accompanying drawing, A A represent the side bars of the links B, the open hook at one end of, and uniting, said bars; and C, the cylindrical end bar, extending across and uniting the opposite ends of said bars, and all cast or otherwise formed in one piece, as shown. The cylindrical portion or end bar C is made of greater diameter than the bars A, and snugly fills the eye $b$ of the hook B when placed therein, while the side bars are flattened and expanded in width in the direction of the length of the cylindrical part C, for giving increased bulk of metal, and, consequently, increased strength, to said bars, and to the point of union between them and the end bar C and hook B. The thickness of the bars is, by this construction, reduced sufficiently to pass the contracted opening in the hook B, when the links are brought to the acute angle or into the relation shown by the links $A^1$ $A^2$, for uniting or disconnecting the links.

For the purpose of facilitating the passage or lateral movement of the hook over the flat side bars, and at the same time giving the greatest possible diameter or thickness to said side bars, the ends of these bars adjacent to the hook and at the sides thereof are beveled, as shown at $a'$, at such a point and in such manner as not in any way to impair the strength of the link, while at the same time freeing the opening in the hook from all obstructing angles or corners.

By this construction all notching or cutting away of any portion of the links for the purpose of connecting or disconnecting them is avoided, and increased strength is given at those portions where the greatest strain comes, while at the same time the hooks can be readily passed over either side bar of the link. Where it is desired to have the hooks removable over one side only, the opposite side bar adjoining the cylindrical part may be re-enforced or given an increased thickness, forming a stop, $a$, for preventing the passage of the hook over said bar.

I am aware that chains have been made in which the links were adapted to be connected or disconnected by means of open hooks passing over notched side bars, and I therefore do not claim such chains, broadly; but

What I claim, and desire to secure by Letters Patent, is—

A driving-chain composed of links having the flattened and expanded side bars A A, open hook B, and cylindrical end bar C, all constructed substantially in the manner and for the purpose set forth.

In testimony whereof I have hereunto set my hand this 24th day of March, A. D. 1875.

JOHN H. ELWARD.

Witnesses:
ALEXANDER MAHON,
JOHN G. CENTER.